(12) United States Patent

Ma et al.

(10) Patent No.: US 9,294,161 B2
(45) Date of Patent: Mar. 22, 2016

(54) SYSTEM AND METHOD FOR INTERFERENCE COORDINATION

(71) Applicant: Huawei Technologies Co., Ltd., Shenzhen (CN)

(72) Inventors: Jianglei Ma, Ottawa (CA); Mohammadhadi Baligh, Kanata (CA); Mark Andrew Hawryluck, Kanata (CA); Keyvan Zarifi, Ottawa (CA); Mohamed Adel Salem, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 13/645,435

(22) Filed: Oct. 4, 2012

(65) Prior Publication Data

US 2013/0286954 A1 Oct. 31, 2013

Related U.S. Application Data

(60) Provisional application No. 61/638,993, filed on Apr. 26, 2012.

(51) Int. Cl.
*H04W 4/00* (2009.01)
*H04B 7/02* (2006.01)
*H04W 72/12* (2009.01)

(52) U.S. Cl.
CPC ............ *H04B 7/024* (2013.01); *H04W 72/1231* (2013.01); *H04W 72/1247* (2013.01)

(58) Field of Classification Search
CPC .............................. H04W 16/32; H04W 24/02
See application file for complete search history.

(56) References Cited

U.S. PATENT DOCUMENTS

| | | | |
|---|---|---|---|
| 2006/0104334 A1* | 5/2006 | Hervey et al. | 375/133 |
| 2010/0142471 A1 | 6/2010 | Cheng et al. | |
| 2011/0237272 A1* | 9/2011 | Gorokhov et al. | 455/452.1 |
| 2011/0286398 A1 | 11/2011 | Chung et al. | |
| 2012/0178462 A1* | 7/2012 | Kim | 455/450 |
| 2013/0005376 A1* | 1/2013 | Shirani-Mehr et al. | 455/509 |
| 2013/0114523 A1* | 5/2013 | Chatterjee et al. | 370/329 |
| 2013/0272170 A1* | 10/2013 | Chatterjee et al. | 370/280 |

OTHER PUBLICATIONS

International Search Report and Written Opinion of Patent Cooperation Treaty (PCT), International Application No. PCT/US13/38489, date of mailing Sep. 26, 2013, Applicant Huawei Technologies Co., Ltd., 10 pages.
Jimaa, S., et al., "LTE-A an Overview and Future Research Areas," Second International Workshop on the Performance Enhancements in MIMO-OFDM Systems, 2011, pp. 395-399, IEEE.
Harada, H., "Wireless Cloud Computing and Cognitive Wireless Cloud," The $3^{rd}$ EU-Japan Symposium on the "Future Internet", Oct. 20, 2012, 22 pages, National Institute of Information and Communications Technology.

\* cited by examiner

*Primary Examiner* — Chi H Pham
*Assistant Examiner* — Fahmida Chowdhury
(74) *Attorney, Agent, or Firm* — Slater & Matsil, L.L.P.

(57) ABSTRACT

A method for operating an interference coordinating entity (ICE) includes partitioning, by the ICE, a cloud radio access network (CRAN) cluster by grouping transmission points (TPs) serving user equipments (UEs) in accordance with a partitioning criterion into at least one virtual transmission point (V-TP) to produce a V-TP set. The UEs to be served are preferably offset from a V-TP boundary. The method also includes saving, by the ICE, V-TP information to a memory.

28 Claims, 13 Drawing Sheets

SYSTEM AND METHOD FOR INTERFERENCE COORDINATION

This application claims the benefit of U.S. Provisional Application No. 61/638,993, filed on Apr. 26, 2012, entitled "System and Method for Hierarchical Interference Coordination for CRAN," which application is hereby incorporated herein by reference.

TECHNICAL FIELD

The present disclosure relates generally to digital communications, and more particularly to a system and method for interference coordination.

BACKGROUND

Cloud Radio Access Networks (CRAN) enabled joint processing (JP) techniques, such as joint scheduling, joint transmission, and the like, have shown significant promise in improving throughput and coverage, as well as reducing operating expenses, of Third Generation Partnership (3GPP) Long Term Evolution Advanced (LTE-A) communications networks. Typically, a strong backhaul link between transmission points (TP) and a global controller, such as a central coordinating unit (CCU), is needed to form a joint transmission point from one or more TPs in a hyper-cell and realize multi-transmit point functionality inherent in CRAN.

An efficient implementation of joint processing, e.g., joint scheduling, joint transmission, and the like, also requires stringent inter-TP synchronization, as well as accurate channel knowledge of the user equipment (UE) operating in the hyper-cell. Meeting these requirements and/or constraints may become infeasible as the size of the hyper-cells increases. Furthermore, computational costs involved in joint processing also increases dramatically with the large number of UEs inherent in large hyper-cells.

SUMMARY OF THE DISCLOSURE

Example embodiments of the present disclosure which provide a system and method for interference coordination.

In accordance with an example embodiment of the present disclosure, a method for operating an interference coordinating entity (ICE) is provided. The method partitioning, by the ICE, a cloud radio access network (CRAN) cluster by grouping transmission points (TPs) serving user equipments (UEs) in accordance with a partitioning criterion into at least one virtual transmission point (V-TP) to produce a V-TP set. The UEs to be served are preferably offset from a V-TP boundary. The method also includes saving, by the ICE, V-TP information to a memory.

In accordance with another example embodiment of the present disclosure, an interference coordinating entity (ICE) is provided. The ICE includes a processor, and a memory operatively coupled to the processor. The processor partitions a cloud radio access network (CRAN) cluster by grouping transmission points (TPs) serving user equipments (UEs) in accordance with a partitioning criterion into at least one virtual transmission point (V-TP) to produce a V-TP set. The UEs are preferably offset from a V-TP boundary. The memory stores V-TP information.

In accordance with another example embodiment of the present disclosure, a communications network is provided. The communications network includes a plurality of cloud radio access network (CRAN) clusters, and a first interference coordinating entity (ICE) operatively coupled to a first one of the CRAN clusters. Each CRAN cluster includes a plurality of transmission points (TPs) that serves user equipments (UEs), the plurality of TPs partitioned into a virtual transmission point (V-TP) set of at least one V-TP, where the UEs are preferably offset from a V-TP boundary, and where each V-TP is a joint processing unit. The first ICE partitions the first one of the CRAN clusters according to a corresponding V-TP set.

One advantage of an embodiment is that joint processing overhead is reduced by partitioning a communications network into multiple CRAN clusters, and by further partitioning each of the CRAN clusters into multiple virtual transmit points, which are basic units for interference coordination.

A further advantage of an embodiment is that with multiple V-TP sets of a single CRAN cluster, it is ensured that no UE is a V-TP boundary UE in all V-TP sets. Therefore, if joint processing is possible for a UE, then it is ensured that joint processing can be used in at least one V-TP set.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to interference coordination. For example, at an interference coordinating entity, a CRAN cluster is partitioned by grouping transmission points that are serving UEs according to a partitioning criterion into at least one virtual transmission point to produce a virtual transmission point set. The UEs to be served are preferably being offset from a virtual transmission point boundary. Virtual transmission point information is saved to a memory.

The present disclosure will be described with respect to example embodiments in a specific context, namely a CRAN deployment of a 3GPP LTE-A communications network. The disclosure may also be applied, however, to CRAN deployments of standards and non-standards compliant communications networks, as well as to other communications networks that allow transmission point grouping.

Figure 1A:
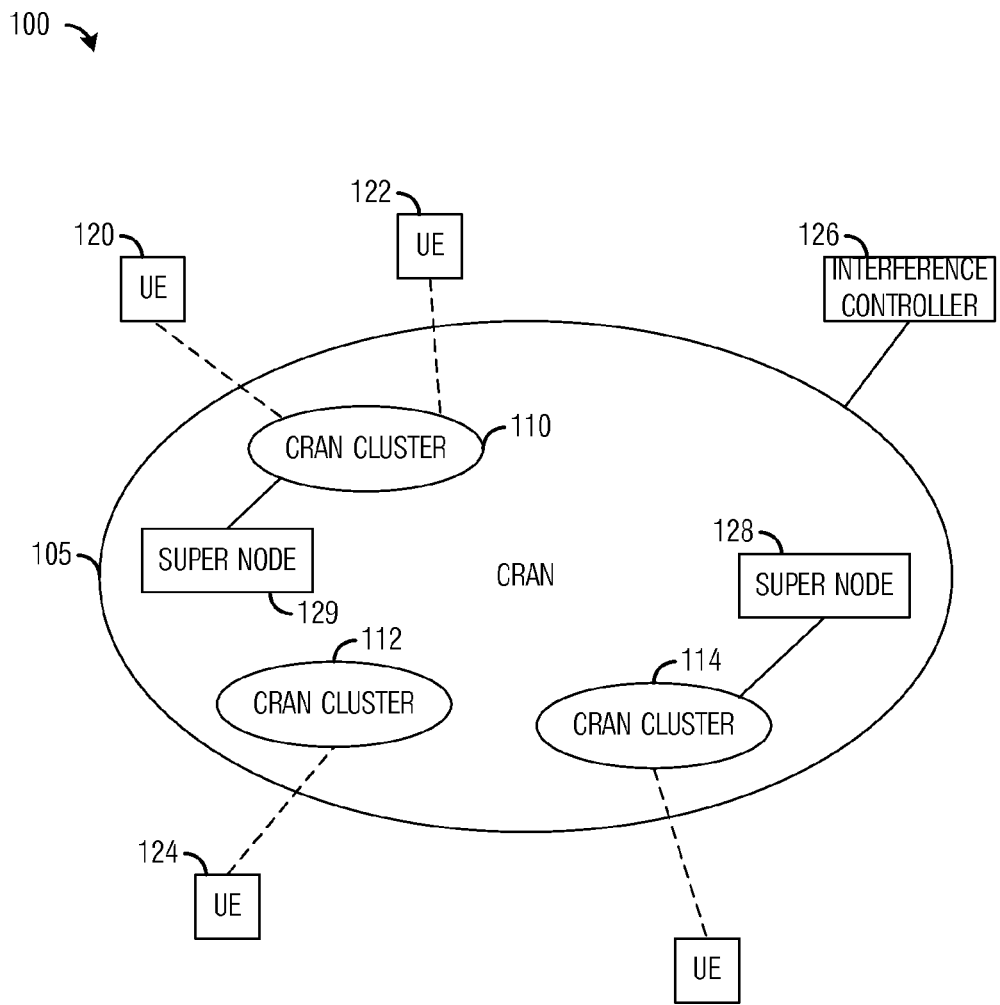
FIGS. 1a through 1c illustrate an example communications network according to example embodiments described herein.

FIG. 1a illustrates a communications network 100. Communications network 100 includes a CRAN 105, which is partitioned into a plurality of CRAN clusters, such as CRAN cluster 110, CRAN cluster 112, and CRAN cluster 114. Each CRAN cluster may serve UEs. As an example, CRAN cluster 110 serves UE 120 and UE 122, while CRAN cluster 112 serves UE 124. It is noted that a CRAN cluster may serve a large number of UEs and that FIG. 1a illustrates only a small number of UEs to maintain simplicity. Each CRAN cluster may be partitioned into one or more virtual transmission points (V-TP), which in turn may be formed from one or more TPs. A V-TP may be a single TP or a plurality of TPs that transmit jointly. In general, the CRAN clusters may have different numbers of V-TPs, TPs, and the like, as well as serve different numbers of UEs.

Communications network 100 may also include an interference controller 126, e.g., a global controller, a CCU, and the like, that may be used to perform interference coordination for the TPs, V-TPs, CRAN clusters, and/or communications network 100. Communications network 100 may also include one or more super nodes, e.g., super node 128 and super node 129, which may be used to perform interference coordination for TPs, V-TPs, and/or CRAN clusters. It is noted that interference controller 126 and the super nodes may or may not operate in a cooperative mode with one another to perform interference coordination. It is also noted that some CRAN clusters may have super nodes that perform interference coordination, while other CRAN clusters may not have super nodes that perform interference coordination. As an example, CRAN cluster 110 has super node 129, but CRAN cluster 112 does not. Furthermore, an amount of interference coordination performed by super nodes may differ per CRAN cluster. As an example, a first super node may perform interference coordination for a CRAN cluster to which it is coupled, while a second super node may perform interference coordination for the TPs, V-TPs, as well as a CRAN cluster to which it is coupled.

One or more TPs of a V-TP may perform interference coordination for the TP(s) of the V-TP. As an illustrative example, consider a situation where a V-TP includes three TPs, then interference coordination for the three TPs may be performed by one of the TPs in the V-TP. As an alternative example, interference coordination for the three TPs may be performed by all three of the TPs in the V-TP. As an alternative example, interference coordination for the three TPs may be performed by two of the TPs in the V-TP. In general, interference coordination for the TPs of a V-TP may be performed by a subset of the TPs in the V-TP.

The interference controller (e.g., global controller, a CCU, and the like) performing interference coordination for the TPs, the V-TPs, the CRAN clusters, and/or the communications network, the super node(s) performing interference coordination for the TPs and/or the V-TPs, as well as V-TP entities implemented in a centralized or distributed manner in TP(s) of each V-TP performing interference coordination for the TPs of the V-TP may be referred to as interference coordinating entity (or interference coordinating entities), ICE.

It is noted that although interference coordination may be performed at different levels of a communications network, a V-TP is a basic unit for interference coordination. Therefore, UE selection, UE scheduling, resource allocation, as well as transmission with joint processing (e.g., joint transmission, joint scheduling, and the like), precoding, and the like, occur at V-TP granularity.

Figure 1B:
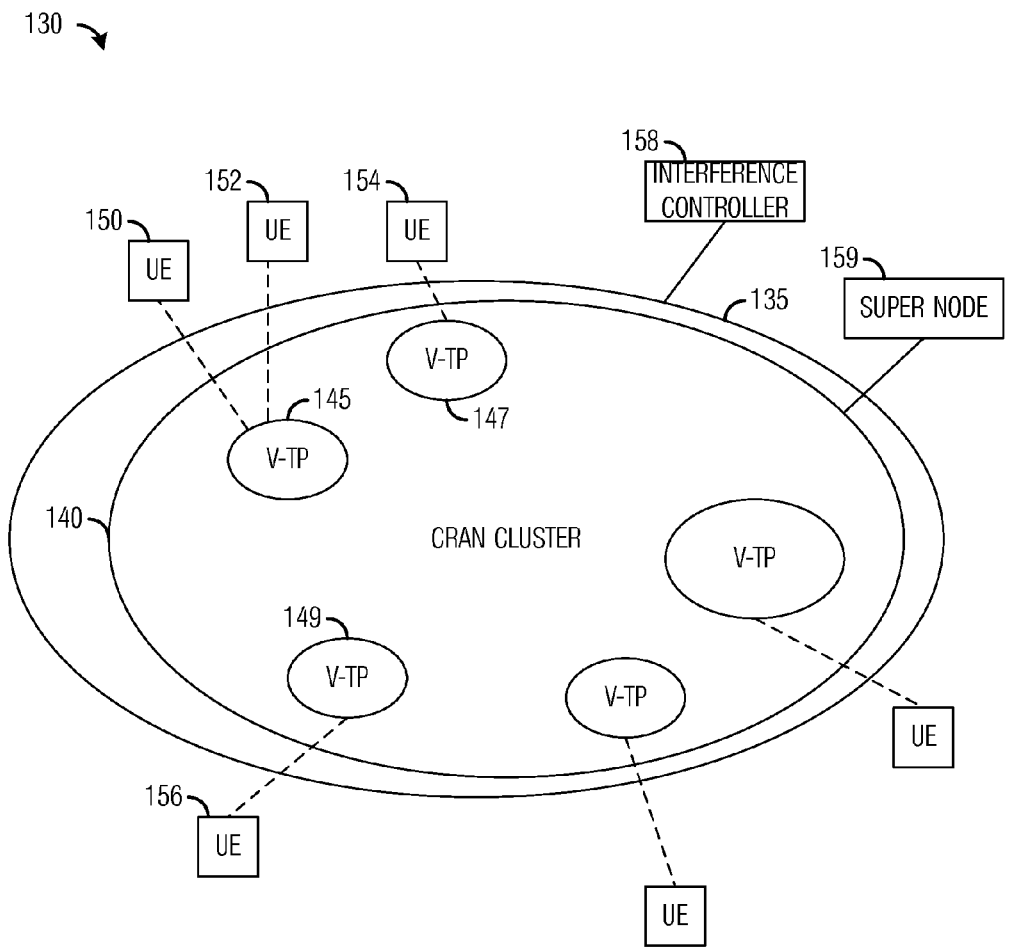

FIG. 1b illustrates a communications network 130, where a single CRAN cluster is highlighted. As shown in FIG. 1b, communications network 130 includes CRAN 135 that includes a CRAN cluster 140. Also shown in FIG. 1b are interference controller 158 and super node 159 operating as interference coordinating entities.

It is noted that CRAN 135 may include other CRAN clusters, but only CRAN cluster 140 is shown. CRAN cluster 140 may be partitioned into a plurality of V-TPs, such as V-TP 145, V-TP 147, and V-TP 149. In general, a V-TP may be a smallest allocatable joint processing unit. A V-TP may include one or more transmission points, such as an eNB, a cell, a relay node, a remote radio head, and the like. A single V-TP may serve one or more UEs. As an example, V-TP 145 may serve UE 150 and UE 152, while V-TP 147 serves UE 154 and V-TP 149 serves UE 156.

Figure 1C:
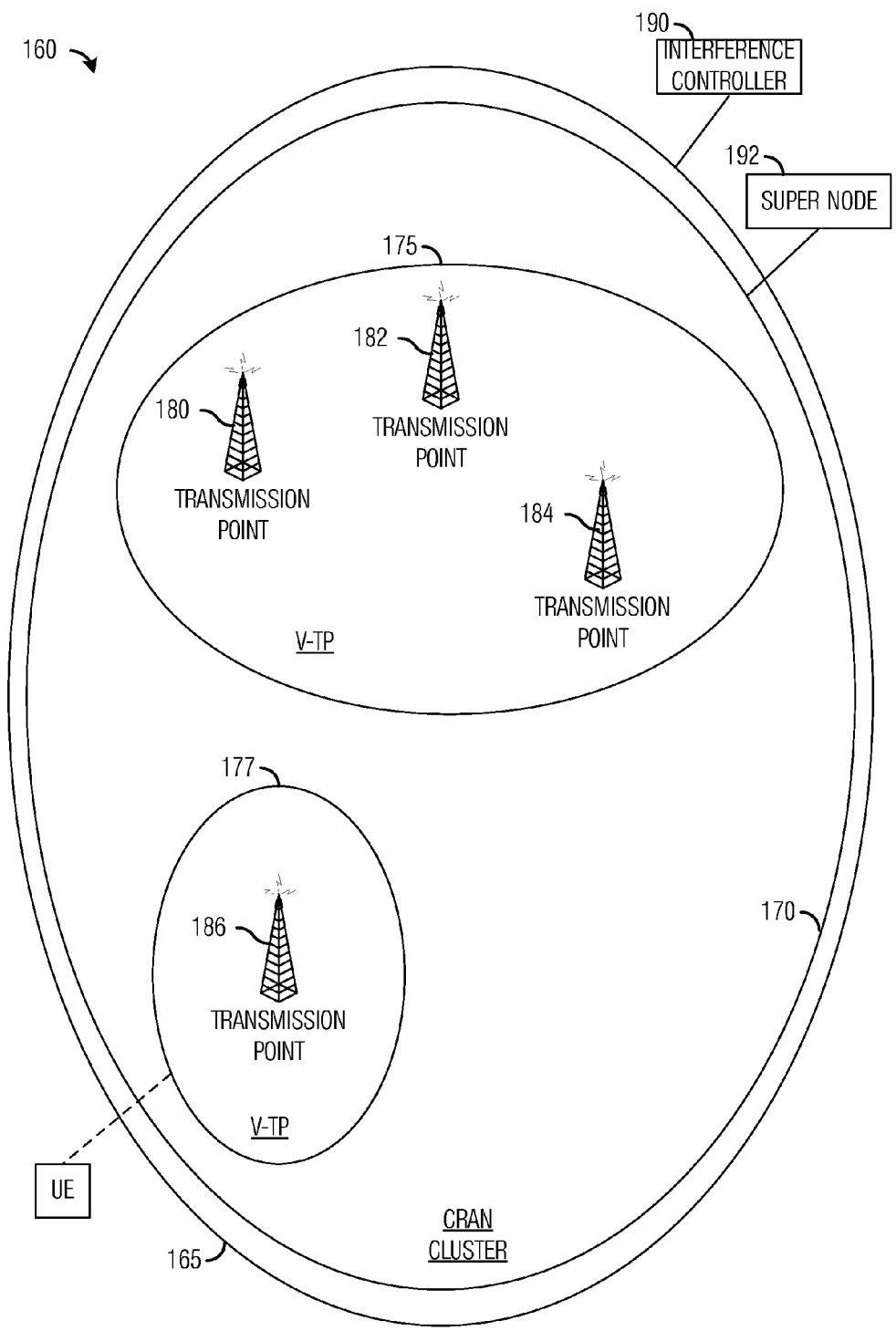

FIG. 1c illustrates a communications network 160, wherein V-TPs are highlighted. As shown in FIG. 1c, communications network 160 includes CRAN 165 that includes a CRAN cluster 170. It is noted that CRAN 165 may include other CRAN clusters, but only CRAN cluster 170 is shown. CRAN cluster 170 may be partitioned into a plurality of V-TPs, such as V-TP 175, and V-TP 177. As discussed previously, a V-TP may include one or more transmission points, which may be an eNB, a cell, a relay node, a remote radio head, and the like. As an example, V-TP 175 includes three transmission points, transmission points 180-184, while V-TP 177 includes transmission point 186. As discussed previously, a subset of TPs in a V-TP may perform interference coordination for the V-TP. Communications network 160 may also include an interference controller 190 and a super node 192. Interference controller 190, a super node 192, and/or V-TP entities (a physical entity or a logical entity located in a V-TP that performs interference coordination for TPs within the V-TP) in V-TPs of CRAN cluster 170 may be operating as interference coordinating entities. It is noted that although CRAN cluster 170 is connected to super node 192, other CRAN clusters in communications network 160 may or may not be connected to other super nodes.

While it is understood that communications networks may employ multiple TPs in multiple V-TPs and CRAN clusters capable of communicating with a number of UEs, a small number of CRAN clusters, V-TPs, TPs, and UE are illustrated for simplicity.

Some features of CRANs, such as baseband processing power pooling, as well as an availability of a high speed backhaul in a CRAN makes more advanced joint processing techniques possible. As an example, CRAN cluster based joint transmission may be a straightforward and powerful CRAN joint processing technique and can eliminate interference within the CRAN cluster. However, a maximum joint transmission size that may be supported in an actual implementation may be restricted by factors such as:

baseband processing capability since the computational complexity increases with increased joint transmission size;

backhaul capability since an amount of data that is exchanged between jointly transmitting TPs also increases with increased joint transmission size; and non-ideal characteristics of an actual implementation.

The previously discussed requirements and/or constraints along with increased computational costs involved in joint processing, such as joint scheduling and/or joint transmission, suggest partitioning the communications network into multiple CRAN clusters and independently performing joint processing within each CRAN cluster. It is noted that the complexity of MU-MIMO type of joint transmission (measured in terms of complex operations) increases proportionally to the 4-th power of the number of scheduled transmission layers over the number of jointly scheduled UEs. As such, to fully exploit the centralized baseband signal processing capability of CRAN and while considering practical limitations on the maximum allowed size of JP in real deployments, the CRAN clusters are often required to be further partitioned to disjoint V-TPs which are the basic scheduling and/or transmitting units.

Typically, interference arises from unwanted transmissions received at a receiving device, such as at a UE, an eNB, a relay node, and the like. As an example, a transmission to a first UE operating at or near a boundary (or similarly, an edge) of a first TP's coverage area may also be received by a second UE operating in a second TP's coverage area. Since the first TP and the second TP are usually different, it may not be possible to prevent or reduce interference without some form of interference coordination. Similarly, interference from a transmission made in a first V-TP may interfere with the performance of UEs served by a second V-TP, as are transmissions made in a first CRAN cluster may interfere with performance of UEs in a second CRAN cluster.

It may be possible to perform interference coordination at different levels of a communications network. However, interference coordination at different levels may achieve differing degrees of success in terms of interference mitigation and may impact communications network efficiency differently. As an example, interference coordination may be performed at a communications network level, wherein an interference reduction technique is applied between CRAN clusters. As another example, interference coordination may be performed at a CRAN cluster level, wherein an interference reduction technique is applied between V-TPs of a single CRAN cluster. As yet another example, interference coordination may be performed at an inter V-TP level, wherein an interference reduction technique is applied between TPs of a single V-TP.

Interference coordination at a single level, whether at the communications network level, the CRAN cluster level, the V-TP level, or some other level, may yield measurable performance improvements, such as improved fairness of UE experience, increased communications network throughput, lowered error rate, increased resource utilization, and the like. However, it may be possible to achieve even greater performance improvements by simultaneously performing interference coordination at multiple levels by using a single interference coordinating entity or by using multiple interference coordinating entities. Furthermore, the interference coordination performed at the multiple levels may produce differing amounts of performance gain. As an example, an interference coordination technique that is particularly effective but is computationally expensive may be applied at a low level where the joint processing costs are small, thereby incurring relatively low costs.

Figure 2:
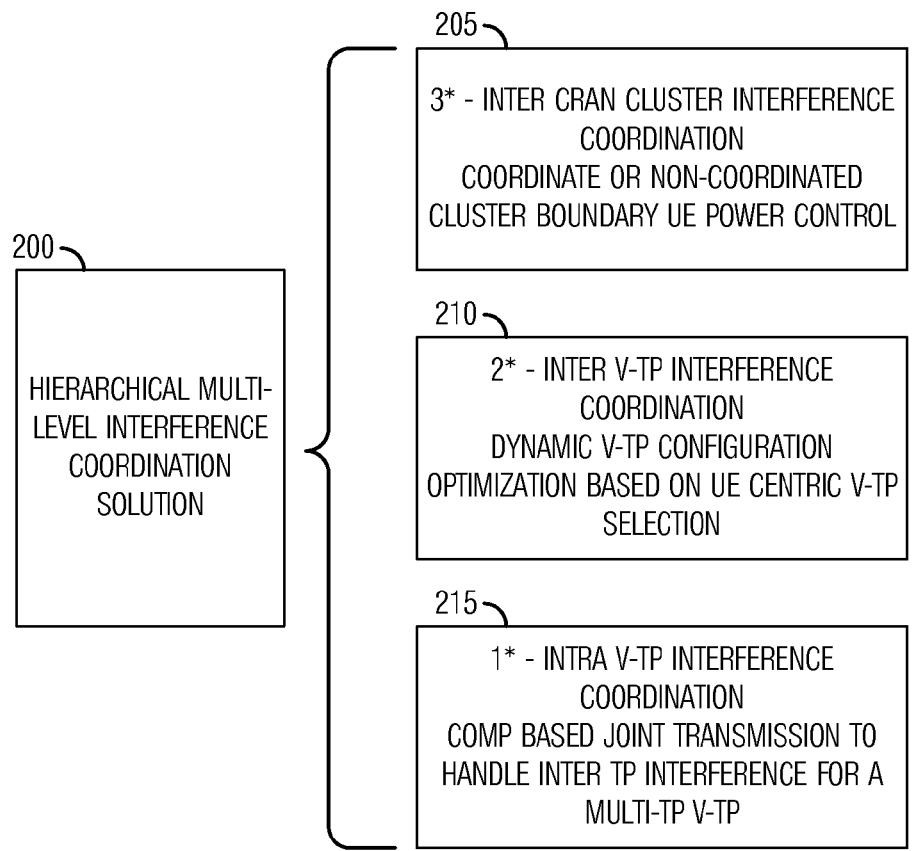
FIG. 2 illustrates an example high level view of a hierarchical multi-level interference coordination technique for interference mitigation and improving communications network efficiency in a CRAN communications network according to example embodiments described herein.

FIG. 2 illustrates a high level view of a hierarchical multi-level interference coordination technique 200 for interference mitigation and improving communications network efficiency in a CRAN communications network. Hierarchical multi-level interference coordination technique 200 applies interference coordination at multiple levels of a communications network to obtain performance improvement, such as improved fairness of UE experience, increased communications network throughput, lowered error rate, increased resource utilization, and the like, typically not achievable through interference coordination at a single level of the communications network.

Hierarchical multi-level interference coordination technique 200 may include inter CRAN cluster interference coordination at a highest level of the communications network, labeled as "3*" (block 205). As an example, inter CRAN cluster interference coordination may utilize a coordinated interference coordination technique, such as fractional frequency reuse (FFR) where network resources (e.g., frequency resources, time resources, or both frequency and time resources) may be partitioned and distributed between the CRAN clusters, to reduce or eliminate interference. As an example, consider a communications network with three CRAN clusters. The network resources may be partitioned into three disjoint units and each of the three CRAN clusters may be assigned one of the three units. Since the transmissions occur in disjoint units, transmission from one CRAN cluster would not cause interference in another CRAN cluster. As another example, it may be possible to assign orthogonal soft fractional frequency reuse patterns to neighboring CRAN clusters and then to reduce inter-CRAN cluster interference by coordinating transmit power levels in the different CRAN clusters.

As another example, inter CRAN cluster interference coordination may utilize an uncoordinated interference coordination technique, such as CRAN cluster boundary UE power control where TPs in V-TPs transmit at different power levels to UEs that are operating at CRAN cluster boundaries, CRAN cluster boundary UEs, and UEs that are not operating at CRAN cluster boundaries, i.e., CRAN cluster center UEs. In a simple two transmit power level technique, the TPs may transmit to the CRAN cluster boundary UEs at a lower transmit power level than transmissions to the CRAN cluster center UEs, to reduce or eliminate interference between CRAN clusters. As another example, a combination of coordinated and uncoordinated interference coordination techniques may be used, such as FFR with CRAN cluster boundary UE power control, to reduce or eliminate interference between CRAN clusters. A discussion of an intra CRAN cluster interference coordination technique is provided below.

Hierarchical multi-level interference coordination technique 200 may include inter V-TP interference coordination at a middle level of the communications network, labeled as "2*" (block 210). As an example, inter V-TP interference coordination may include dynamic V-TP configuration optimization that places TPs of a CRAN cluster into a plurality of V-TP sets that ensures that all UEs can be a center UE (i.e., a UE located away from V-TP boundaries or edges) for at least one V-TP set in the CRAN cluster and then performs V-TP set selection according to the UEs to be scheduled in each scheduling time and/or frequency. In other words, the UEs to be served are preferably disposed (located) away from V-TP boundaries. The inter V-TP interference coordination ensures that within the CRAN cluster, UEs are served by the best one of the V-TPs in the CRAN cluster and that there are no intra CRAN cluster V-TP boundary UEs. A discussion of an example inter V-TP interference coordination technique is provided below.

Hierarchical multi-level interference coordination technique 200 may include intra V-TP interference coordination at a lowest level of the communications network, labeled as "1*" (block 215). As an example, intra V-TP interference coordination may include joint processing, e.g., joint transmission (JT) based CoMP, to handle inter TP interference in a multiple TP V-TP. In a multiple TP V-TP, joint processing, e.g., JT, may be used to coordinate transmissions to UEs served by the V-TP to reduce or eliminate interference. A discussion of an intra V-TP interference coordination technique is provided below.

Hierarchical multi-level interference coordination technique 200 may be performed by a single interference coordinating entity or by a combination of several interference coordinating entities. As an example, hierarchical multi-level interference coordination technique 200 may be performed by an interference controller, such as controller 126. As another example, hierarchical multi-level interference coordination technique 200 may be performed by an interference controller, such as controller 126, as well as a super node, such as super node 128 and super node 129. As yet another example, hierarchical multi-level interference coordination technique 200 may be performed by an interference controller, such as controller 126, as well as a super node, such as super node 128 and super node 129, as well as a V-TP entity, which may be a physical entity or a logical entity located in a V-TP that performs interference coordination for TPs within the V-TP. The V-TP entity may be a single TP in the V-TP, distributed across multiple TPs in the V-TP, a separate entity within the V-TP, and the like.

Figure 3A:
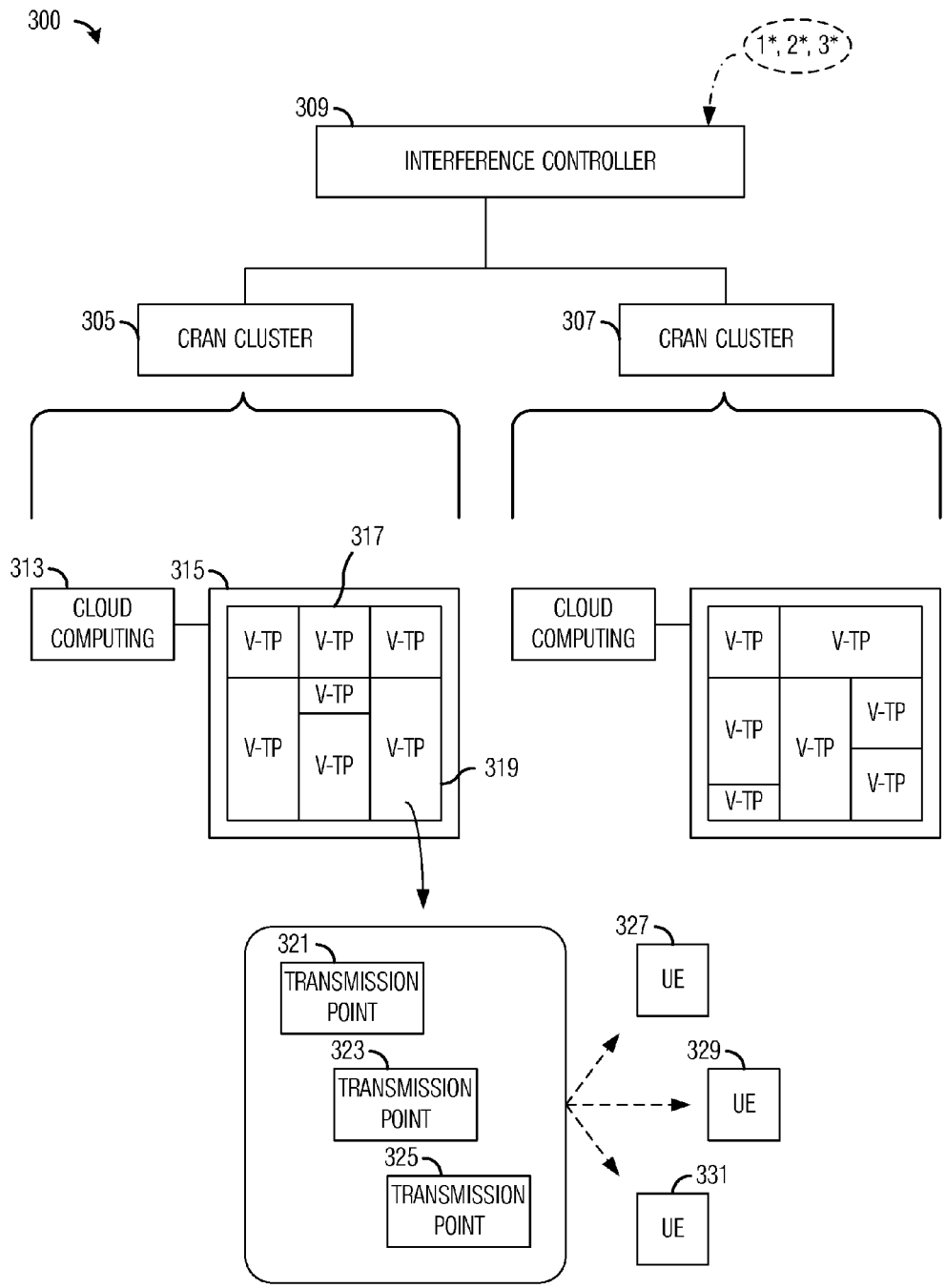
FIGS. 3a through 3d illustrate an example communications network with a controller(s) performing hierarchical multi-level interference coordination technique for interference mitigation and improving communications network efficiency according to example embodiments described herein.

FIG. 3a illustrates a communications network 300, wherein an interference coordinating entity performs a hierarchical multi-level interference coordination technique for interference mitigation and improving communications network efficiency in communications network 300. As shown in FIG. 3a, communications network 300 is partitioned into a plurality of CRAN clusters, such as CRAN cluster 305 and CRAN cluster 307. The CRAN clusters may be disjoint where the CRAN clusters do not have any TPs in common with one another; the CRAN clusters may share one or more TPs with one another; or some of the CRAN clusters may be disjoint, while others may share one or more TPs with other CRAN clusters.

Communications network 300 may also include an interference controller 309 (an example of an interference coordinating entity) that is configured to perform a hierarchical multi-level interference coordination technique for interference mitigation and improving communications network efficiency, such as hierarchical multi-level interference coordination technique 200. Interference controller 309 may implement all of the different levels of interference coordination techniques in the hierarchical multi-level interference coordination technique. As an illustrative example, interference controller 309 may implement levels 1*, 2*, and 3* of hierarchical multi-level interference coordination technique 200.

For illustrative purposes, the discussion focuses on CRAN cluster 305. However, other CRAN clusters in communications network 300, such as CRAN cluster 307 may have similar general structure. Therefore, the discussion of CRAN cluster 305 should not be construed as being limiting to either the scope or the spirit of the example embodiments. CRAN cluster 305 may include a cloud computing component 313 that provides computational resources for an access network (AN) component 315 of CRAN cluster 305. AN component 315 may be partitioned into a plurality of V-TPs, such as V-TP 317 and V-TP 319, according to a dynamic V-TP configuration optimization technique. As an example, cloud computing component 313 may provide computational resources for joint processing utilized in the V-TPs of AN component 315. It is noted that different V-TPs may have different numbers of TPs.

As discussed previously, a V-TP may include one or more TPs serving one or more UEs. As an example, V-TP 319 may include three TPs (TP 321, TP 323, and TP 325) that serve UEs (such as UE 327, UE 329, and UE 331). It is noted that one or more TPs of a V-TP may serve a single UE. As an example, TP 321 and TP 323 may serve UE 327, while TP 321, TP 323, and TP 325 serve UE 329, and TP 325 may serve UE 331.

Figure 3B:
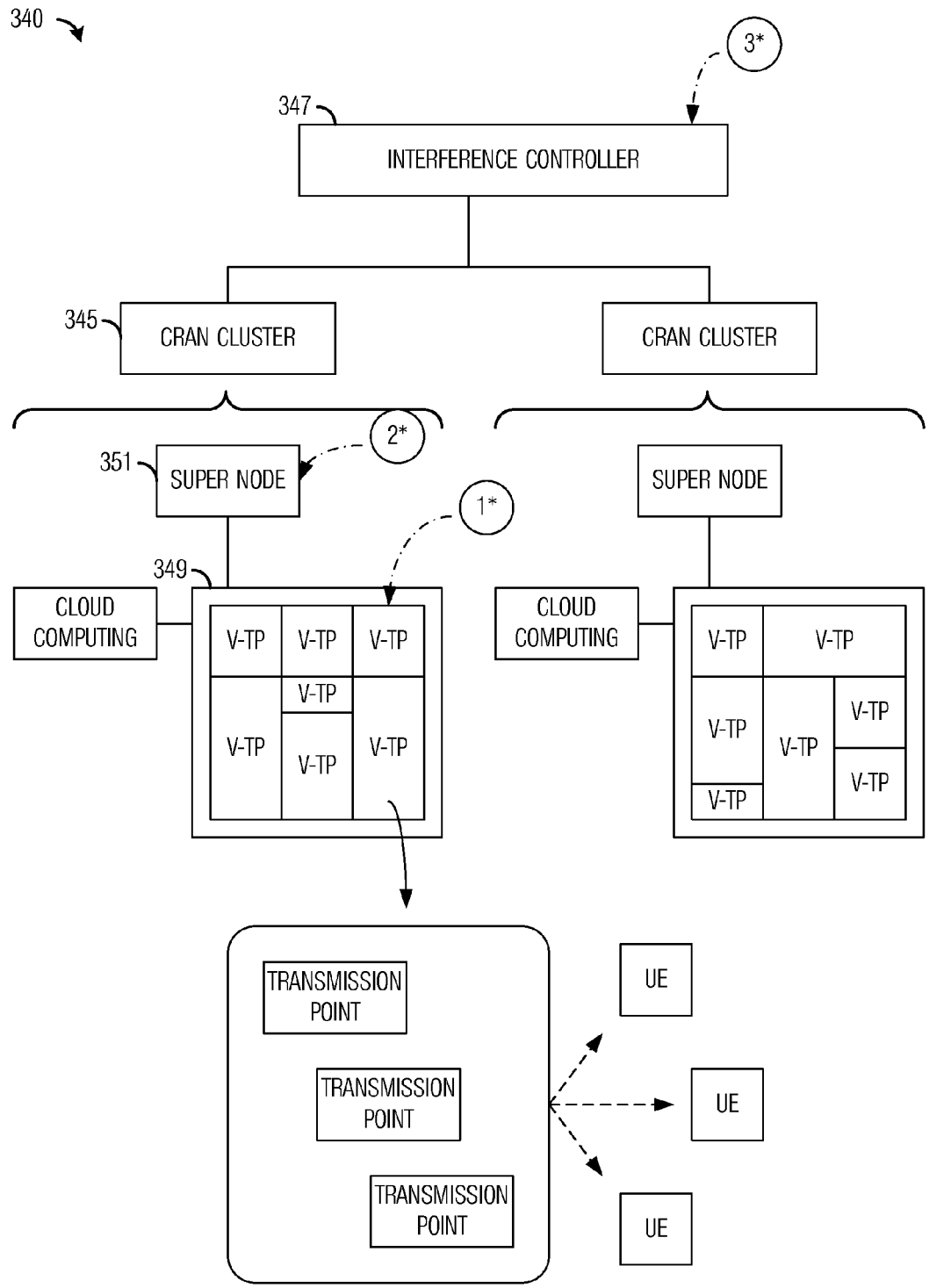

FIG. 3b illustrates a communications network 340, wherein different interference coordinating entities each perform a hierarchical multi-level interference coordination technique for interference mitigation and improving communications network efficiency in communications network 340. As shown in FIG. 3b, communications network 340 is partitioned into a plurality of CRAN clusters, such as CRAN cluster 345. Communications network 340 may include an interference controller 347 (an example of an interference coordinating entity) that is used to perform a highest level of a hierarchical multi-level interference coordination technique for interference mitigation and improving communications network efficiency, such as hierarchical multi-level interference coordination technique 200. As an example, interference controller 347 may implement level 3* of hierarchical multi-level interference coordination technique 200, providing interference relief for CRAN clusters of communications network 340.

For illustrative purposes, the discussion focuses on CRAN cluster 345. CRAN cluster 345 includes an AN component 349 that is partitioned into a plurality of V-TPs. CRAN cluster 345 also includes a super node 351(another example of an interference coordinating entity). Super node 351 may be used to perform a middle level of a hierarchical multi-level interference coordination technique for interference mitigation and improving communications network efficiency, such as hierarchical multi-level interference coordination technique 200. As an example, super node 351 may implement level 2* of hierarchical multi-level interference coordination technique 200, providing interference relief for CRAN cluster 345 of communications network 340.

V-TP entities of the V-TPs (examples of interference coordinating entities) of AN component 349 may perform a lowest level of a hierarchical multi-level interference coordination technique for interference mitigation and improving communications network efficiency, such as hierarchical multi-level interference coordination technique 200. As an example, a first V-TP entity implemented in a single TP in a first V-TP may implement level 1* of hierarchical multi-level interference coordination technique 200, providing interference relief for TPs in the first V-TP. As another example, a second V-TP entity implemented in a distributed manner in a subset of the TPs in a second V-TP may implement level 1* of hierarchical multi-level interference coordination technique 200, providing interference relief for TPs in the second V-TP. As another example, a third V-TP entity implemented as a separate entity in a third V-TP may implement level 1* of hierarchical multi-level interference coordination technique 200, providing interference relief for TPs in the third V-TP.

Figure 3C:
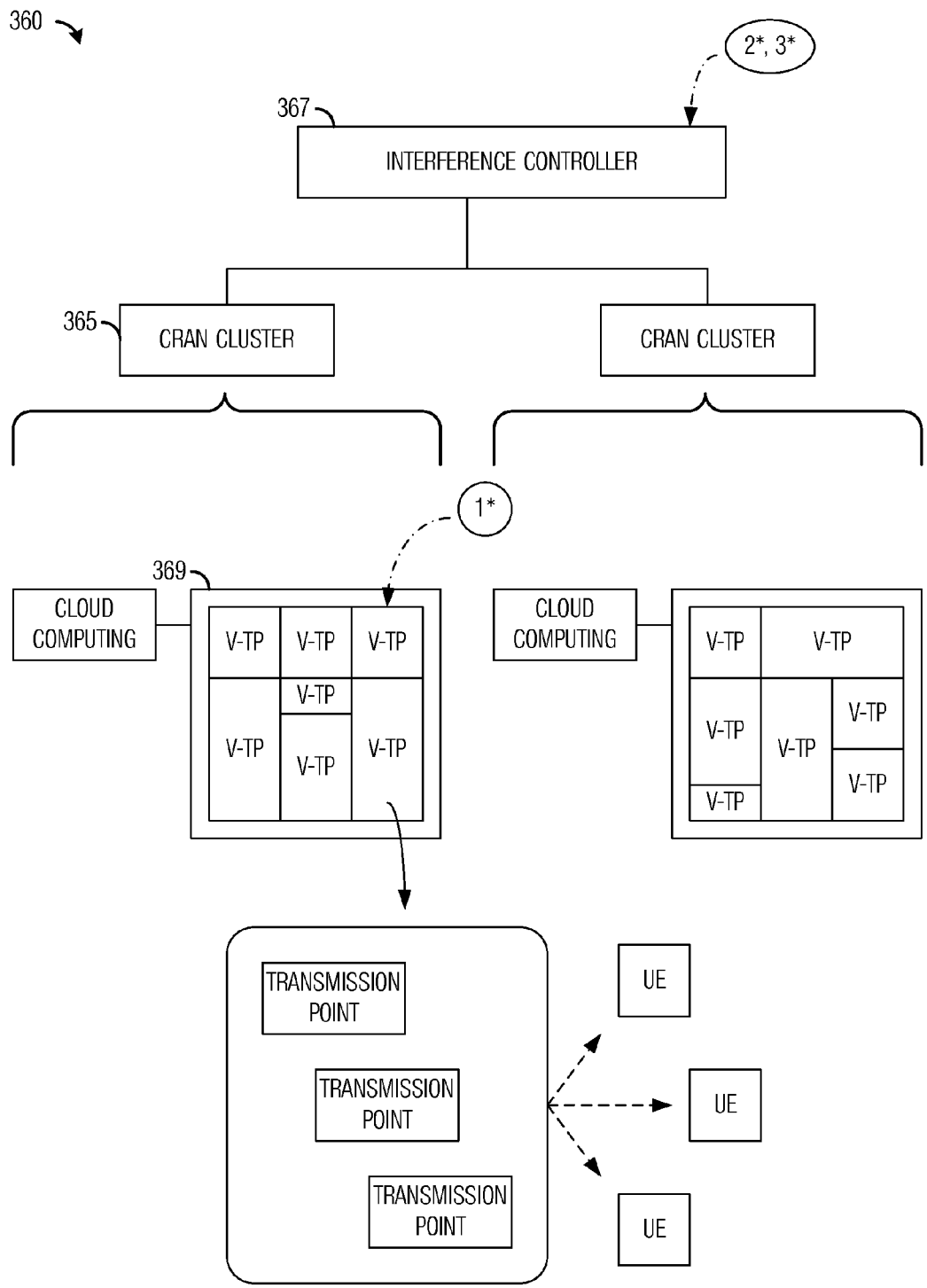

FIG. 3c illustrates a communications network 360, wherein different interference coordinating entities perform first portions of a hierarchical multi-level interference coordination technique for interference mitigation and improving communications network efficiency in communications network 360. As shown in FIG. 3c, communications network 360 is partitioned into a plurality of CRAN clusters, such as CRAN cluster 365. Communications network 360 may include an interference controller 367 (an example of an interference coordinating entity) that is used to perform several levels of a hierarchical multi-level interference coordination technique for interference mitigation and improving communications network efficiency, such as hierarchical multi-level interference coordination technique 200. As an example, interference controller 367 may implement levels 2* and 3* of hierarchical multi-level interference coordination technique 200, providing interference relief for the CRAN clusters as well as individual CRAN clusters of communications network 360.

For illustrative purposes, the discussion focuses on CRAN cluster 365. CRAN cluster 365 includes an AN component 369 that is partitioned into a plurality of V-TPs. V-TP entities of the V-TPs (examples of interference coordinating entities) of AN component 369 may perform a lowest level of a hierarchical multi-level interference coordination technique for interference mitigation and improving communications network efficiency, such as hierarchical multi-level interference coordination technique 200. As an example, a first V-TP entity implemented in a single TP in a first V-TP may implement level 1* of hierarchical multi-level interference coordination technique 200, providing interference relief for TPs in the first V-TP. As another example, a second V-TP entity implemented in a distributed manner in a subset of the TPs in a second V-TP may implement level 1* of hierarchical multi-level interference coordination technique 200, providing interference relief for TPs in the second V-TP. As another example, a third V-TP entity implemented as a separate entity in a third V-TP may implement level 1* of hierarchical multi-level interference coordination technique 200, providing interference relief for TPs in the third V-TP.

Figure 3D:
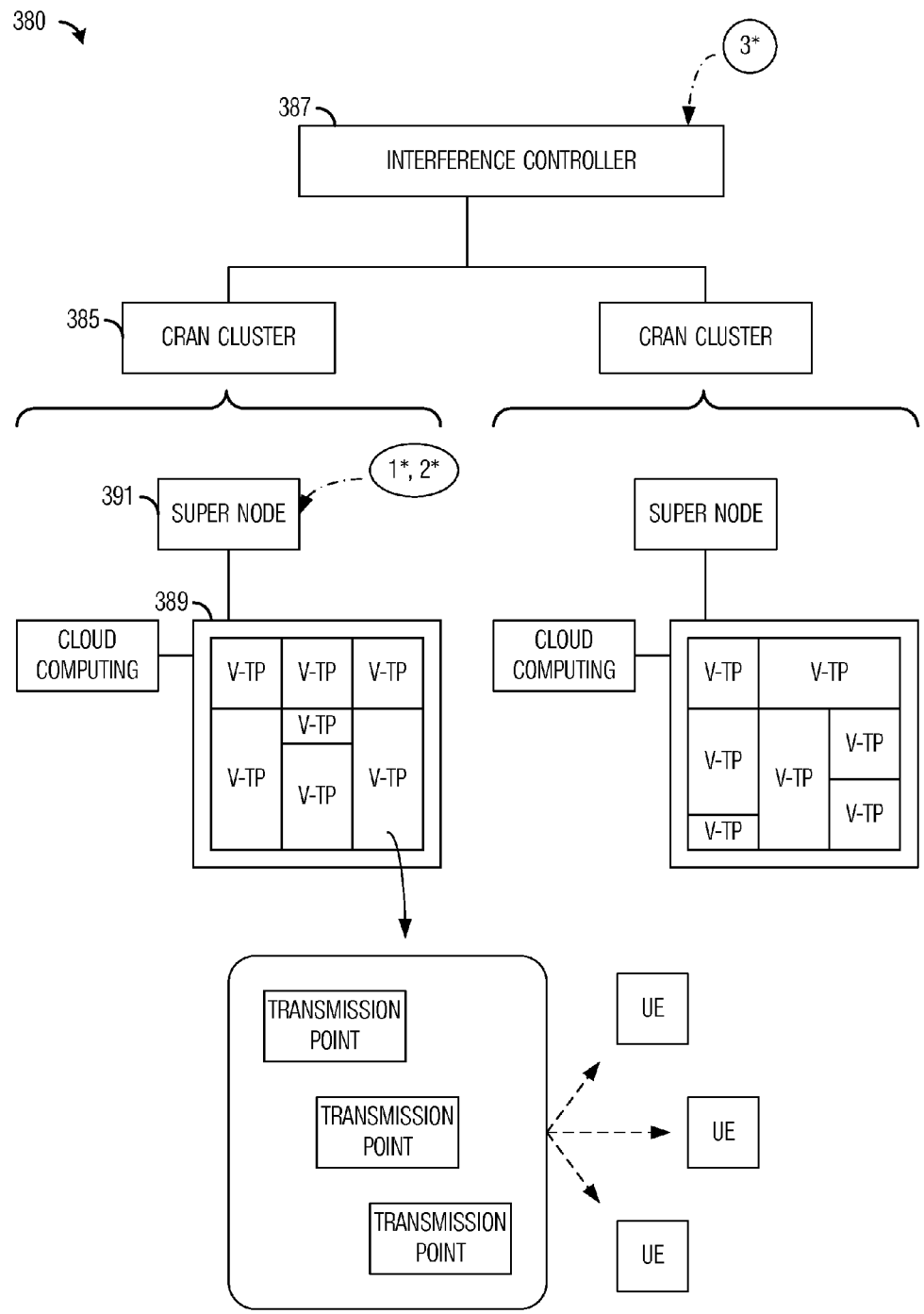

FIG. 3d illustrates a communications network 380, wherein different interference coordinating entities perform second portions of a hierarchical multi-level interference coordination technique for interference mitigation and improving communications network efficiency in communications network 380. As shown in FIG. 3d, communications network 380 is partitioned into a plurality of CRAN clusters, such as CRAN cluster 385. Communications network 380 may include an interference controller 387 (an example of an interference coordinating entity) that is used to perform a highest level of a hierarchical multi-level interference coordination technique for interference mitigation and improving communications network efficiency, such as hierarchical multi-level interference coordination technique 200. As an example, interference controller 387 may implement level 3* of hierarchical multi-level interference coordination technique 200, providing interference relief for CRAN clusters of communications network 380.

For illustrative purposes, the discussion focuses on CRAN cluster 385. CRAN cluster 385 includes an AN component 389 that is partitioned into a plurality of V-TPs. CRAN cluster 385 also includes a super node 391(another example of an interference coordinating entity). Super node 391 may be used to perform a lowest level and a middle level of a hierarchical multi-level interference coordination technique for interference mitigation and improving communications network efficiency, such as hierarchical multi-level interference coordination technique 200. As an example, super node 391 may implement level 1* and 2* of hierarchical multi-level interference coordination technique 200, providing interference relief for CRAN cluster 385 and V-TPs therein of communications network 380.

Other illustrative example embodiments may include:

A super node in a CRAN cluster performing a highest level and a middle level of a hierarchical multi-level interference coordination technique, such as levels 3* and 2*, while V-TP entities of the V-TPs of AN components of CRAN clusters perform a lowest level of a hierarchical multi-level interference coordination technique, such as level 1*; and A super node in a CRAN cluster performing all of the hierarchical multi-level interference coordination technique, such as levels 3*, 2*, and 1*.

It is noted that the illustrative example embodiments of an interference coordinating entity or different interference coordinating entities of communications networks implementing differing levels of a hierarchical multi-level interference coordination technique shown in FIG. 3a through 3d are not intended to be an exhaustive listing of possible combinations interference coordinating entities performing different levels. Other combinations of interference coordinating entities and levels of hierarchical multi-level interference coordination techniques may be possible. Therefore, the example embodiments highlighted in FIG. 3a through 3d and discussed herein should not be construed as being limiting to either the scope or the spirit of the example embodiments.

Figure 4:
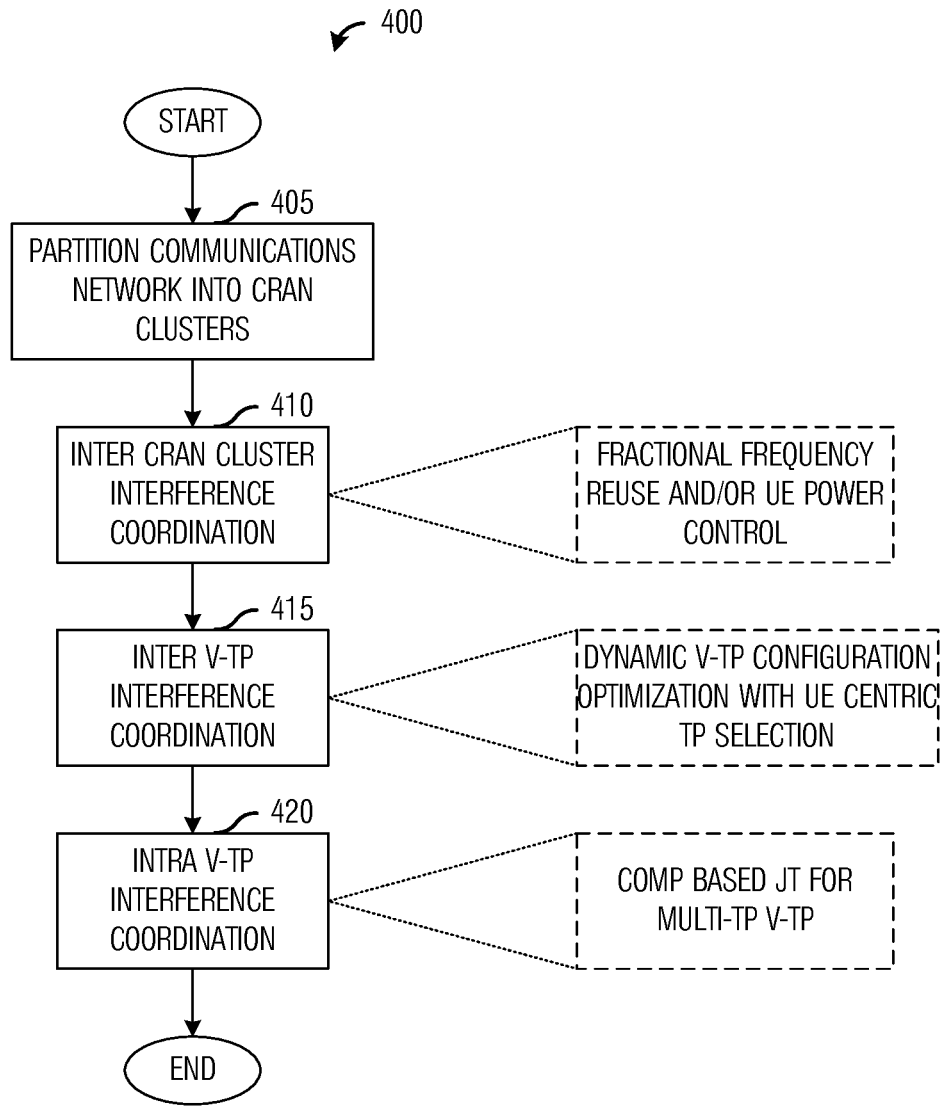
FIG. 4 illustrates an example flow diagram of operations in an interference coordinating entity performing a hierarchical multi-level interference coordination technique according to example embodiments described herein.

FIG. 4 illustrates a flow diagram of operations 400 in an interference coordinating entity performing a hierarchical multi-level interference coordination technique. Operations 400 may be indicative of operations occurring in an interference coordinating entity, such as in interference controller 309, a super node, and the like, as the interference coordinating entity performs a hierarchical multi-level interference coordination technique providing interference receive to a communications network.

Operations 400 may begin with the interference coordinating entity partitioning the communications network into a plurality of CRAN clusters (block 405). The partitioning of the communications network into the plurality of CRAN clusters may be based on a number of network partitioning criterion, including: available baseband processing power to perform processing for TPs in a CRAN cluster, available bandwidth in backhauls connecting the TPs, number of TPs, TP distribution, and the like. In general, if baseband processing power and/or available bandwidth is limited, the CRAN clusters may need to be smaller to reduce computational requirements and/or bandwidth requirements. As an example, computational complexity increases with the increase in JT size. Also, an amount of information exchanged between TPs operating in JT increases with the increase in JT size. Additionally, TP number and/or distribution may impact the size of the CRAN clusters. However, since the JT processing may be performed at a different level with potentially smaller JT group size, the CRAN clusters may be permitted to be larger than normal. In an alternative embodiment, the communications network may be already partitioned into the plurality of CRAN clusters and information about the CRAN clusters may be provided to the interference coordinating entity.

The interference coordinating entity may perform inter CRAN cluster interference coordination (block 410). The interference coordinating entity may be an interference controller, a super node, or a combination thereof. As an example, the interference coordinating entity may utilize a coordinated power domain or spatial domain interference coordination technique, such as FFR, reduce or eliminate interference between CRAN clusters. The interference coordination technique may specify a utilization of transmission resources to reduce or eliminate interference. As an example, the interference coordination technique may specify a utilization of transmission resources such as a transmit power level, a priority, a transmission resource utilization pattern, a transmission resource utilization time, and the like, to reduce or eliminate interference. As another example, the interference coordinating entity may utilize an uncoordinated interference coordination technique, such as CRAN cluster boundary UE power control, to reduce or eliminate interference between CRAN clusters. As another example, a combination of coordinated and uncoordinated interference coordination techniques may be used, such as FFR with CRAN cluster boundary UE power control, by the interference coordinating entity to reduce or eliminate interference between CRAN clusters.

Figure 5:
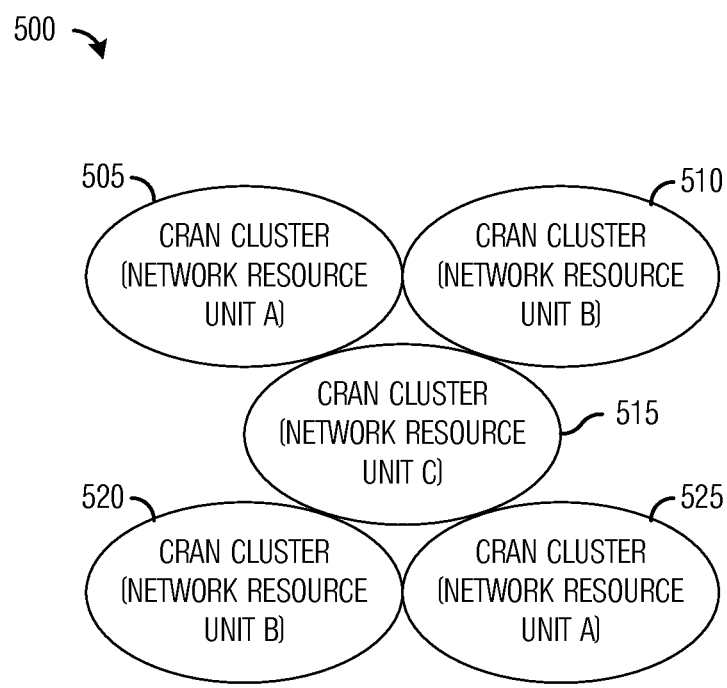
FIG. 5 illustrates an example communications network partitioned into CRAN clusters, wherein the CRAN clusters are assigned network resource units to reduce or eliminate interference between CRAN clusters according to example embodiments described herein.

FIG. 5 illustrates a communications network 500 partitioned into CRAN clusters, wherein the CRAN clusters are assigned transmission resource units to reduce or eliminate interference between CRAN clusters. As shown in FIG. 5, communications network 500 is partitioned into five CRAN clusters. An interference coordinating entity performs inter CRAN cluster interference coordination using FFR with network resources partitioned into three transmission resource units: transmission resource unit A, transmission resource unit B, and transmission resource unit C. The interference coordinating entity may assign the transmission resource units to the five CRAN clusters so that TPs in the CRAN clusters may transmit without causing significant interference to other CRAN clusters. As an example, CRAN cluster 505 may be assigned to transmit using transmission resource unit A, CRAN cluster 510 may be assigned to transmit using transmission resource unit B, and CRAN cluster 515 may be assigned to transmit using transmission resource unit C. Additionally, CRAN cluster 520 may be assigned to transmit using transmission resource unit B, and CRAN cluster 525 may be assigned to transmit using transmission resource unit A. It is noted that although CRAN cluster 505 and CRAN cluster 525 are both transmitting using transmission resource unit A, since they are not immediately adjacent to each other, the interference caused may be much lower than if the CRAN clusters were immediately adjacent to each other. A similar situation exists with CRAN cluster 510 and CRAN cluster 520. In addition to or in lieu of FFR, the interference coordinating entity may utilize CRAN cluster UE power control.

As another example, consider a situation where the transmission resources of a communications network is partitioned into primary resource units and secondary transmission resource units. Each CRAN cluster may be assigned a primary transmission resource unit(s) and a secondary transmission resource unit(s) and then depending on how a particular CRAN cluster's neighboring CRAN cluster(s) are utilizing their primary transmission resource unit(s) and secondary transmission resource unit(s), the particular CRAN cluster selects the use of its own primary transmission resource unit(s) and secondary transmission resource unit(s) to complement the transmissions of its neighboring CRAN cluster(s).

Referring back now to FIG. 4, the interference coordinating entity may perform inter V-TP interference coordination (block 415). As an example, the interference coordinating entity may utilize dynamic V-TP configuration optimization that places TPs of a CRAN cluster by setting boundaries of V-TPs with an intent being to eliminate or minimize UEs disposed on V-TP boundaries. It is noted that the interference coordinating entity attempts to set boundaries of V-TPs to eliminate UEs disposed on V-TP boundaries but it may not be possible to do so in all situations. Furthermore, the interference coordinating entity may not be able to eliminate UEs disposed on CRAN cluster boundaries. Therefore, the interference coordinating entity may generate multiple V-TP sets with each V-TP set being a single instance of the interference coordinating entity setting V-TP boundaries. The interference coordinating entity may set V-TP boundaries for the multiple V-TP sets so that no UE is disposed on V-TP boundaries in all of the multiple V-TP sets.

Figure 6A:
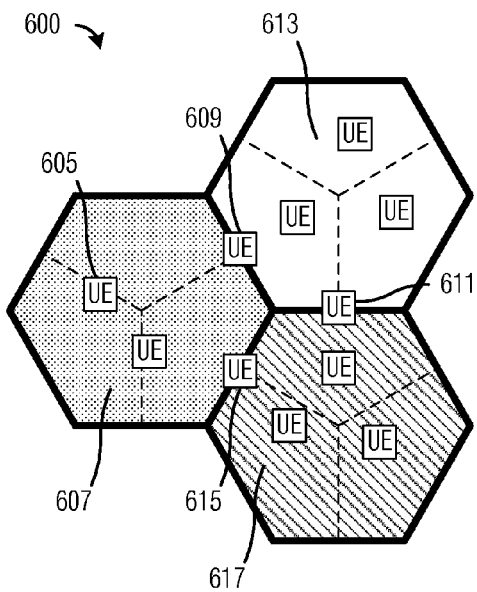
FIGS. 6a through 6d illustrate an example CRAN cluster and example V-TP sets generated in the CRAN cluster according to example embodiments described herein.

FIG. 6a through 6d illustrate a CRAN cluster and example V-TP sets generated in the CRAN cluster. FIG. 6a illustrates a CRAN cluster 600 that includes three eNBs with each eNB having a coverage area partitioned into three sectors (each eNB's coverage area is shown in FIG. 6a with a different cross-hatch pattern). It is noted that the coverage areas of the eNBs as shown in FIG. 6a also form a V-TP set. Operating in CRAN cluster 600 may be a plurality of UEs. Some of the UEs are operating in a center of an eNB's coverage area (e.g., UE 605 is operating in the center of coverage area 607. Other UEs are operating near a boundary of an eNB's coverage area (e.g., UE 609 is near a boundary of coverage area 607, while UE 611 is operating near a boundary of coverage area 613, and UE 615 is operating near a boundary of coverage area 617). It is noted that some UEs may be considered to be operating near a boundary of several coverage areas, e.g., UE 609 may be operating near a boundary of coverage areas 607 and 613, while UE 611 may be operating near a boundary of coverage areas 613 and 617 and UE 615 may be operating near a boundary of coverage areas 607 and 617.

Figure 6B:
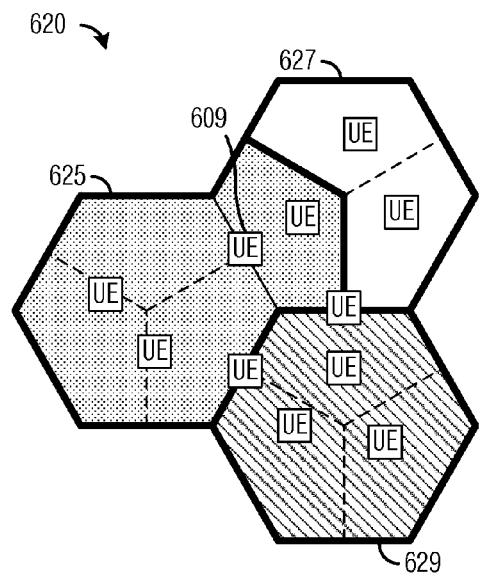
Figure 6C:
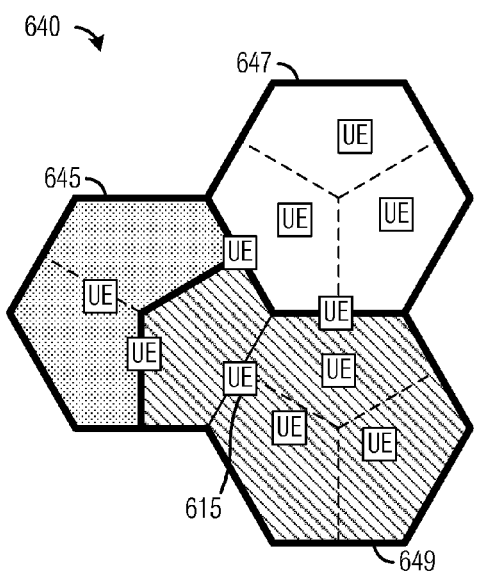
Figure 6D:
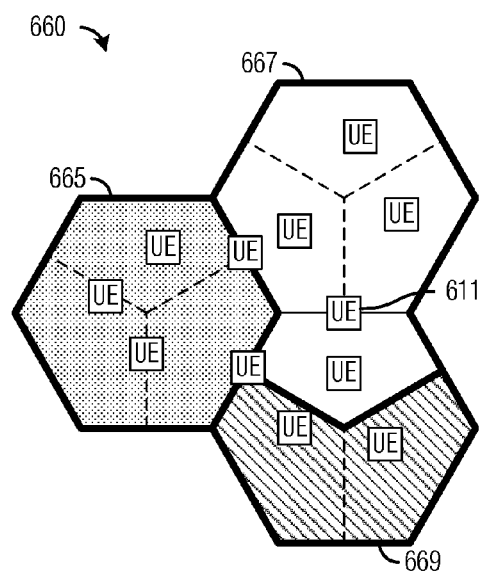

FIG. 6b illustrates a first V-TP set 620 formed on CRAN cluster 600. First V-TP set 620 includes V-TP 625, V-TP 627, and V-TP 629. It is noted that the boundary of V-TP 625 has been extended (at the expense of V-TP 627) to include UE 609 in V-TP 625. UE 609 is a UE that is near a boundary of coverage areas 607 and 613 (as drawn in FIG. 6a). However, by setting the boundaries of V-TP 625 as shown in FIG. 6b, UE 609 is now a V-TP center UE. FIG. 6c illustrates a second V-TP set 640 formed on CRAN cluster 600. Second V-TP set 640 includes V-TP 645, V-TP 647, and V-TP 649. It is noted that the boundary of V-TP 649 has been extended (at the expense of V-TP 645) to include UE 615 in V-TP 649. UE 615 is a UE that is near a boundary of coverage areas 607 and 617 (as drawn in FIG. 6a). However, by setting the boundaries of V-TP 649 as shown in FIG. 6c, UE 615 is now a V-TP center UE. FIG. 6d illustrates a third V-TP set 660 formed on CRAN cluster 600. Third V-TP set 660 includes V-TP 665, V-TP 667, and V-TP 669. It is noted that the boundary of V-TP 667 has been extended (at the expense of V-TP 669) to include UE 611 in V-TP 667. UE 611 is a UE that is near a boundary of coverage areas 613 and 617 (as drawn in FIG. 6a). However, by setting the boundaries of V-TP 667 as shown in FIG. 6d, UE 611 is now a V-TP center UE. Therefore, according to the three V-TP sets shown in FIGS. 6b through 6d, the three boundary UEs (UE 609, UE 611, and UE 615) become V-TP center UEs in at least one of the three V-TP sets.

The interference coordinating entity may select one of the multiple V-TP sets as the V-TP configuration of the CRAN cluster for each scheduling interval, e.g., transmission timing interval (TTI). The V-TP configuration specifies how the TPs in the CRAN cluster are to be grouped. As an example, the interference coordinating entity may schedule the UEs of the CRAN cluster according to each one of the multiple V-TP sets and determine a merit measurement for the scheduled UEs scheduled in each one of the multiple V-TP sets. Examples of a merit measurement may include one or more of the following: number of UEs scheduled, number of high priority UEs scheduled, number of low priority UEs scheduled, number of JT UEs scheduled, percentage of network resources used, utilization of network resources, achieved data rate, quality of UE experience, power consumption, and the like. The interference coordinating entity may select a V-TP set associated with the largest merit measurement as the V-TP configuration for the CRAN cluster.

Referring back now to FIG. 4, the interference coordinating entity may perform intra V-TP interference coordination (block 420). For V-TPs comprising more than one TP, the interference coordinating entity may utilize JT based CoMP or other joint processing CoMP schemes to handle inter TP interference. CoMP may be used to coordinate transmissions to UEs between the multiple TP to reduce or eliminate intra V-TP interference.

Figure 7:
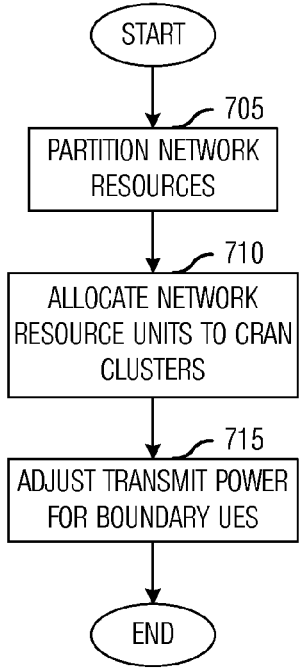
FIG. 7 illustrates an example flow diagram of operations in performing inter CRAN cluster interference coordination according to example embodiments described herein.

FIG. 7 illustrates a flow diagram of operations 700 in performing inter CRAN cluster interference coordination. Operations 700 may be indicative of operations occurring in an interference coordinating entity, such as interference controller or a super node, as the interference coordinating entity performs inter CRAN interference coordination to reduce or eliminate interference in a communications network.

Operations 700 may begin with the interference coordinating entity partitioning transmission resources into a plurality of transmission resource units (which may be disjoint) that may be assigned to different CRAN clusters (block 705). The transmission resource units may be frequency units, time units, or a combination thereof. As an example, time transmission resources, frequency transmission resources and/or spatial transmission resources may be partitioned into the plurality of transmission resource units. The transmission resource units may be allocated to the CRAN clusters of the communications network (block 710). As an example, a coloring algorithm may be used to allocate the transmission resource units to the CRAN clusters of the communications network so that immediately adjacent CRAN clusters do not share the same transmission resource units with the same priority to reduce and/or eliminate interference. In other words, transmission resource units may be shared by immediately adjacent CRAN clusters only if they are assigned different priorities. In addition to transmission resource partitioning and allocation to reduce and/or eliminate interference, transmit power levels for CRAN cluster boundary UEs may be adjusted to reduce and/or eliminate interference (block 715).

Figure 8:
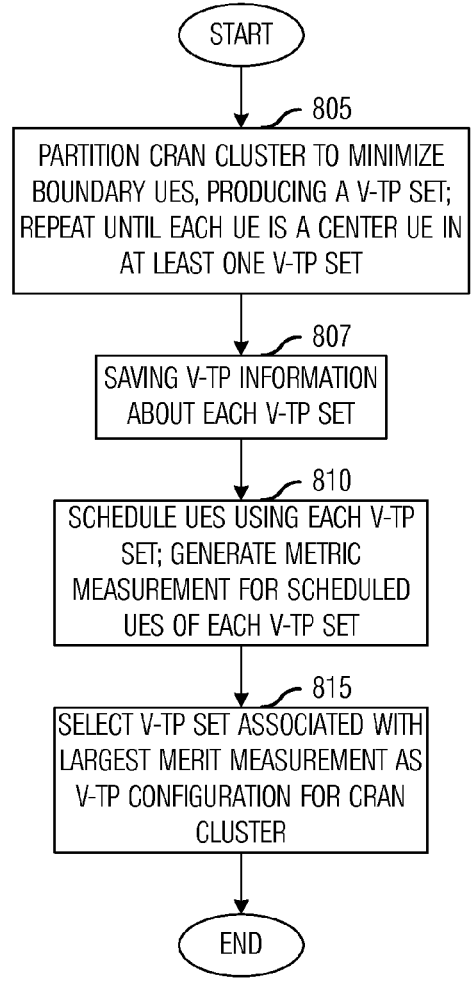
FIG. 8 illustrates an example flow diagram of operations in performing inter V-TP interference coordination according to example embodiments described herein.

FIG. 8 illustrates a flow diagram of operations 800 in performing inter V-TP interference coordination. Operations 800 may be indicative of operations occurring in an interference coordinating entity, such as interference controller or a super node, as the interference coordinating entity performs inter V-TP interference coordination to reduce or eliminate interference in a communications network.

Operations 800 may begin with the interference coordinating entity partitioning a CRAN cluster to minimize boundary UEs, producing a V-TP set (block 805). The CRAN cluster may be partitioned into at least one V-TP, which in turn comprises at least one TP. As an example, the interference coordinating entity may use partitioning criteria, such as information provided by UEs operating in the CRAN cluster, including signal strength measurements, link quality measurements, and the like, to set the V-TP boundaries by grouping TPs so that UEs operating on a boundary of a V-TP are minimized. Since it may be difficult to eliminate all boundary UEs of the CRAN cluster, after producing the V-TP set, the interference coordinating entity may adjust the information associated with the UEs that formerly operated on V-TP boundaries and repeat the partitioning of the CRAN cluster, producing another V-TP set. The interference coordinating entity may continue to repeat the partitioning of the CRAN cluster until it has been able to ensure that there is not a UE that is a boundary UE in all of the V-TP sets. In other words, the UEs are V-TP center UEs in at least one of the V-TP sets. After each V-TP set, V-TP information about the V-TP set may be stored for later use (block 807). As an example, the V-TP information may include a total number of V-TPs, a count of TPs in each V-TP of the V-TP set, information about the TPs in each V-TP of the V-TP set, and the like. The V-TP information may be stored in a memory for later use. As another example, the V-TP information may be provided to the TPs in the CRAN cluster, to an interference coordinating entity, and the like.

For each of the V-TP sets, the interference coordinating entity may schedule the UEs that are capable of being served by their respective TP(s) (block 810). The interference coordinating entity may use the V-TP information previously stored to determine a merit measurement for the UEs that are scheduled to the V-TP. The interference coordinating entity makes use of the V-TPs defined by the V-TP set when scheduling the UEs. As an example, in a first V-TP set, a first UE may be served by just a single TP, while in a second V-TP set, the first UE may be served by two TPs, thereby enabling the interference coordinating entity to use joint transmission in serving the first UE. The interference coordinating entity may select a V-TP set having the largest merit measurement as the V-TP configuration for the CRAN cluster (block 815). Depending upon how the merit measurement is defined, it may be possible that the interference coordinating entity may select the V-TP set having smallest merit measurement as the V-TP configuration for the CRAN cluster. Furthermore, if more than one V-TP set have substantially equal merit measurements, the interference coordinating entity may select a V-TP configuration using V-TP configuration selection history. As an example, the interference coordinating entity may select the V-TP set that has been historically selected the most.

The scheduling of the UEs and the generating of the merit measurement (block 810) and the selecting of the V-TP configuration (block 815) may be referred to as V-TP configuration selection. V-TP configuration selection may be performed for each transmission time of the communications network, such as a transmission frame, a TTI, transmission band, and the like. If the communications network comprises multiple CRAN clusters, operations 800 may be repeated for each CRAN cluster.

Figure 9:
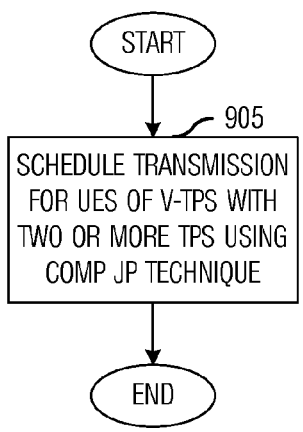
FIG. 9 illustrates an example flow diagram of operations in performing intra V-TP interference coordination according to example embodiments described herein.

FIG. 9 illustrates a flow diagram of operations 900 in performing intra V-TP interference coordination. Operations 900 may be indicative of operations occurring in an interference coordinating entity, such as interference controller, a super node, or a V-TP entity of a V-TP, as the interference coordinating entity performs intra V-TP interference coordination to reduce or eliminate interference in a communications network.

Operations 900 may begin with the interference coordinating entity scheduling transmissions for UEs in V-TPs with two or more TPs (block 905). The interference coordinating entity may employ a CoMP joint processing technique to the transmissions to the UEs. It is noted that if the interference coordinating entity is a V-TP entity of a V-TP and implemented in a distributed manner with multiple TPs, the TPs may share information regarding the UEs, such as communications channel quality information, number of TPs involved, and the like.

Figure 10:
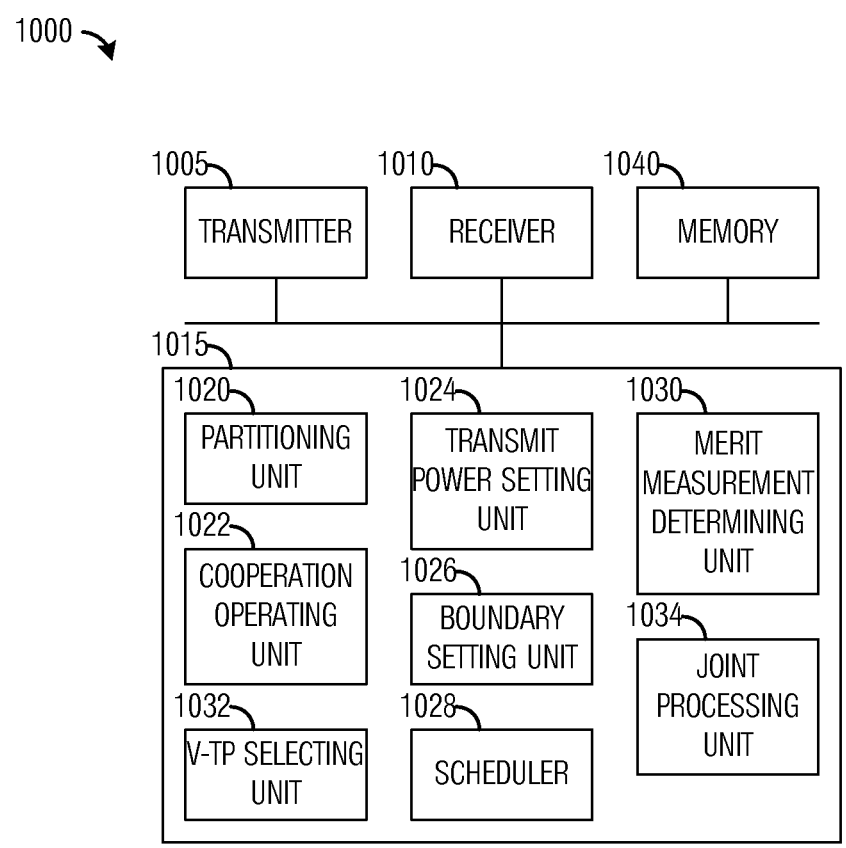
FIG. 10 illustrates an example communications device according to example embodiments described herein.

FIG. 10 provides an illustration of a communications device 1000. Communications device 1000 may be an implementation of an interference coordinating entity, such as interference controller, a super node, or a subset of TPs of a V-TP. Communications device 1000 may be used to implement various ones of the embodiments discussed herein. As shown in FIG. 10, a transmitter 1005 is configured to send packets and/or signals and a receiver 1010 is configured to receive packets and/or signals. Transmitter 1005 and receiver 1010 may have a wireless interface, a wireline interface, or a combination thereof.

A partitioning unit 1020 is configured to partition a communications network into a plurality of CRAN clusters. A cooperation operating unit 1022 is configured to configure the CRAN clusters of the communications network to operate using interference coordination. A transmit power setting unit 1024 is configured to set transmit power levels of transmissions to UEs operating in the communications network according to their position in a CRAN cluster.

A boundary setting unit 1026 is configured to set boundaries for V-TPs of a CRAN cluster to minimize UEs located on a V-TP boundary. Boundary setting unit 1026 generates a V-TP set for the CRAN cluster. Boundary setting unit 1026 repeats the generating of the V-TP sets until it has been able to ensure that there is not a UE that is a boundary UE in all of the V-TP sets. A scheduler 1028 schedules the UEs in the CRAN cluster for service by their respective TPs according to a V-TP set. A merit measurement determining unit 1030 determines a merit measurement for the UEs scheduled for a V-TP set. It is noted that scheduler 1029 and merit measurement determining unit 1030 operates for each V-TP set generated by boundary setting unit 1026. A V-TP selecting unit 1032 selects a V-TP set having a largest merit measurement for the configuration of the CRAN cluster.

A joint processing unit 1034 is configured to schedule UEs for joint transmission by their respective TPs. A memory 1040 is configured to store CRAN cluster information, FFR configuration information, transmit power level settings, V-TP boundaries, V-TP sets, V-TP configurations, merit measurements, joint transmission information, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while partitioning unit 1020, cooperation operating unit 1022, transmit power setting unit 1024, boundary setting unit 1026, scheduler 1028, merit measurement determining unit 1030, V-TP selecting unit 1032, and joint processing unit 1034 may be software modules executing in a processor 1015, a microprocessor, a custom circuit, or a custom compiled logic array of a field programmable logic array. Additionally, partitioning unit 1020, cooperation operating unit 1022, transmit power setting unit 1024, boundary setting unit 1026, scheduler 1028, merit measurement determining unit 1030, V-TP selecting unit 1032, and joint processing unit 1034 may be stored in memory 1040.

Although the present disclosure and its advantages have been described in detail, it should be understood that various changes, substitutions and alterations can be made herein without departing from the spirit and scope of the disclosure as defined by the appended claims.

What is claimed is:

1. A method for operating an interference coordinating entity (ICE), the method comprising:
partitioning, by the ICE, a cloud radio access network (CRAN) cluster by:
grouping, according to a partitioning criterion, transmission points (TPs) serving user equipments (UEs) into at least one virtual transmission point (V-TP) to produce a V-TP set, wherein the UEs to be served are preferably offset from a V-TP boundary;
adjusting the partitioning criterion; and
repeating the partitioning to produce a plurality of V-TP sets;
saving, by the ICE, V-TP information to a memory;
for each V-TP set,
scheduling the UEs that can be served by the TPs for the V-TP set, and
determining a merit measurement for the UEs that have been scheduled for the V-TP set;
selecting one of the merit measurements to determine a V-TP configuration for the CRAN cluster; and
causing, by the ICE, at least one of the TPs to communicate to at least one of the UEs according to parameters of the V-TP configuration.

2. The method of claim 1, wherein the at least one V-TP comprises at least one TP.

3. The method of claim 1, wherein a V-TP is a basic unit for interference coordination.

4. The method of claim 1, wherein there are a plurality of transmission resources, and wherein partitioning the CRAN cluster, scheduling the UEs, determining the merit measurement, and selecting one of the merit measurements is repeated for each transmission resource.

5. The method of claim 1, wherein each V-TP set comprises a plurality of V-TPs, wherein joint processing occurs within a V-TP with more than one TP.

6. The method of claim 1, wherein the selected merit measurement is a largest merit measurement.

7. The method of claim 1, further comprising:
partitioning a communications network into at least two CRAN clusters; and
performing partitioning the CRAN cluster, scheduling the UEs, determining the merit measurement, and selecting one of the merit measurements for each CRAN cluster.

8. The method of claim 7, further comprising
partitioning network resources of the communications network into a plurality of disjoint network resource units; and
allocating one or more network resource units to each CRAN cluster so that adjacent CRAN clusters are only allocated the same network resource unit if different priority levels are also assigned to the adjacent CRAN clusters.

9. The method of claim 8, wherein partitioning the network resources comprises partitioning frequency network resources into a plurality of disjoint frequency network resource units.

10. The method of claim 8, wherein partitioning the network resources comprises partitioning time network resources into a plurality of disjoint time network resource units.

11. The method of claim 8, wherein partitioning the network resources comprises:
partitioning frequency network resources into a plurality of disjoint frequency network resource units; and
partitioning time network resources into a plurality of disjoint time network resource units.

12. The method of claim 8, wherein the ICE is an interference controller.

13. The method of claim 7, further comprising specifying a first utilization for boundary UEs operating near a boundary of the CRAN cluster.

14. The method of claim 13, further comprising specifying a second utilization for other UEs operating in the CRAN cluster.

15. The method of claim 13, wherein the ICE is an interference controller.

16. The method of claim 1, wherein the ICE is a super node.

17. An interference coordinating entity (ICE) comprising:
a processor configured to partition a cloud radio access network (CRAN) cluster by grouping, according to a partitioning criterion, transmission points (TPs) serving user equipments (UEs) into at least one virtual transmission point (V-TP) to produce a V-TP set, wherein the UEs are preferably offset from a V-TP boundary; and
a memory operatively coupled to the processor, the memory configured to store V-TP information; and
wherein the processor is configured to partition the CRAN cluster into a plurality of V-TP sets, to, for each V-TP set, schedule the UEs that can be served by the TPs for the V-TP set, to, for each V-TP set, determine a merit measurement for the UEs that have been scheduled for the V-TP set, and to select one of the merit measurements to determine a V-TP configuration for the CRAN cluster; and
wherein the processor is further configured to cause at least one of the TPs to communicate to at least one of the UEs according to parameters of the V-TP set.

18. The ICE of claim 17, wherein the processor is configured to select a largest one of the merit measurements.

19. The ICE of claim 17, wherein the processor is configured to partition a communications network into at least two CRAN clusters, and wherein the processor is configured to, for each CRAN cluster, partition the CRAN cluster, schedule the UEs, determine the merit measurement, and to select the V-TP configuration for each CRAN cluster.

20. The ICE of claim 19, wherein the processor is configured to partition network resources of the communications network into a plurality of disjoint network resource units, and to allocate one or more network resource units to each CRAN cluster so that adjacent CRAN clusters are only allocated the same network resource unit if different priority levels are also assigned to the adjacent CRAN clusters.

21. The ICE of claim 20, wherein the ICE is an interference controller.

22. The ICE of claim 19, further comprising a transmit power setting unit configured to specify a first transmit power level for boundary UEs operating near a boundary of the CRAN cluster, and to specify a second transmit power level for other UEs operating in the CRAN cluster.

23. The ICE of claim 17, wherein the ICE is a super node.

24. A communications network comprising:
a plurality of cloud radio access network (CRAN) clusters, each CRAN cluster including a plurality of transmission points (TPs) configured to serve user equipments (UEs), the plurality of TPs partitioned, according to a partitioning criterion, into a virtual transmission point (V-TP) set of at least one V-TP, wherein the UEs are preferably offset from a V-TP boundary, and wherein each V-TP is a joint processing unit;
a first interference coordinating entity (ICE) operatively coupled to a first one of the CRAN clusters, the first ICE configured to partition the first one of the CRAN clusters according to a corresponding V-TP set, and further configured to cause at least one of the TPs to communicate to at least one the UEs according to parameters of the corresponding V-TP set; and
a second ICE operatively coupled to a second one of the CRAN clusters, the second ICE configured to partition network resources of the communications network into a plurality of disjoint transmission resource units, and to allocate one or more transmission resource units to each CRAN cluster so that adjacent CRAN clusters are only allocated the same network resource unit if different priority levels are also assigned to the adjacent CRAN clusters.

25. The communications network of claim 24, wherein the first ICE is a super node.

26. The communications network of claim 24, wherein the first ICE and the second ICE is a single entity.

27. The communications network of claim 24, wherein the second ICE is coupled to each CRAN cluster.

28. The communications network of claim 24, wherein the second ICE is an interference controller.

* * * * *

UNITED STATES PATENT AND TRADEMARK OFFICE
CERTIFICATE OF CORRECTION

PATENT NO. : 9,294,161 B2  
APPLICATION NO. : 13/645435  
DATED : March 22, 2016  
INVENTOR(S) : Jianglei Ma Page 1 of 1

It is certified that error appears in the above-identified patent and that said Letters Patent is hereby corrected as shown below:

On the Title Page, Item (72) Inventors, line 5, delete "Kanata (CA)" and insert --Ottawa (CA)--.

Signed and Sealed this  
Seventh Day of June, 2016

Michelle K. Lee  
*Director of the United States Patent and Trademark Office*